Jan. 11, 1927.
E. H. W. FOOT
1,614,356
DRIVEN IMPLEMENT
Filed Oct. 6, 1924
2 Sheets-Sheet 1
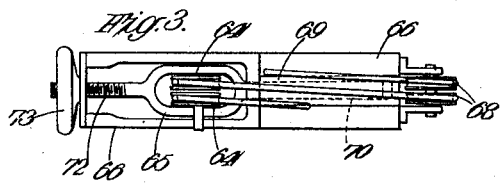
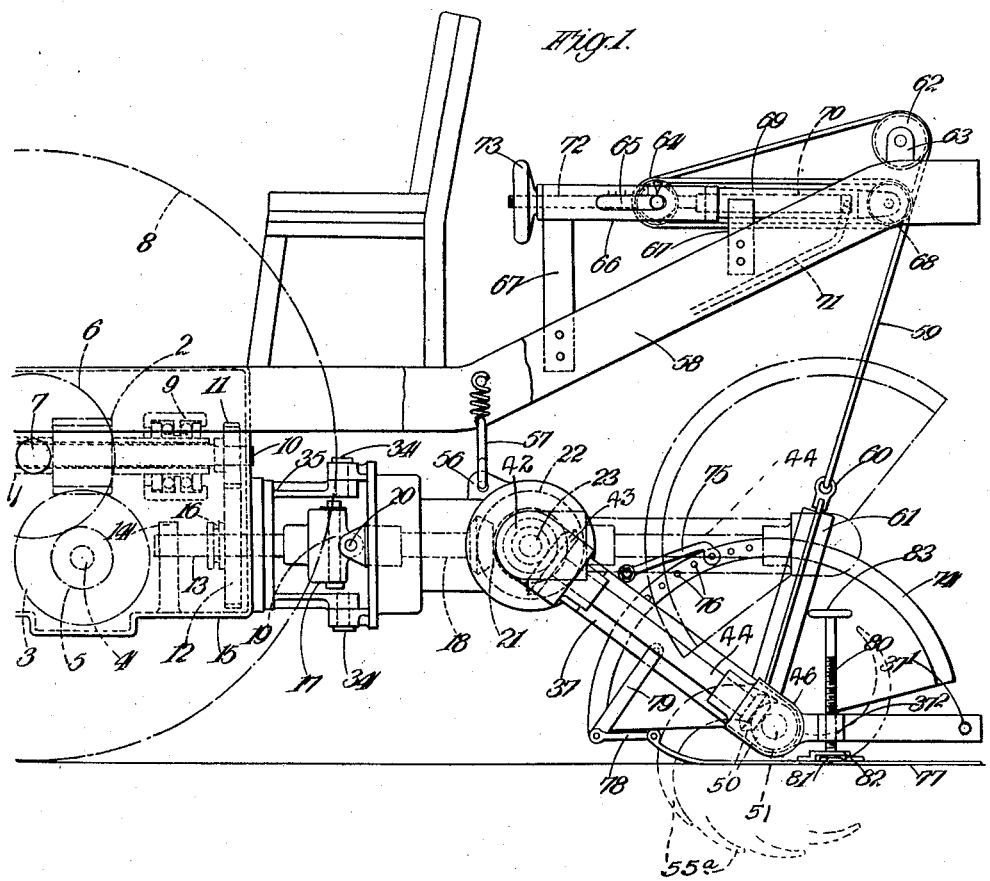
Inventor
Edward Hammond Whalley Foot,
by
Attorney.

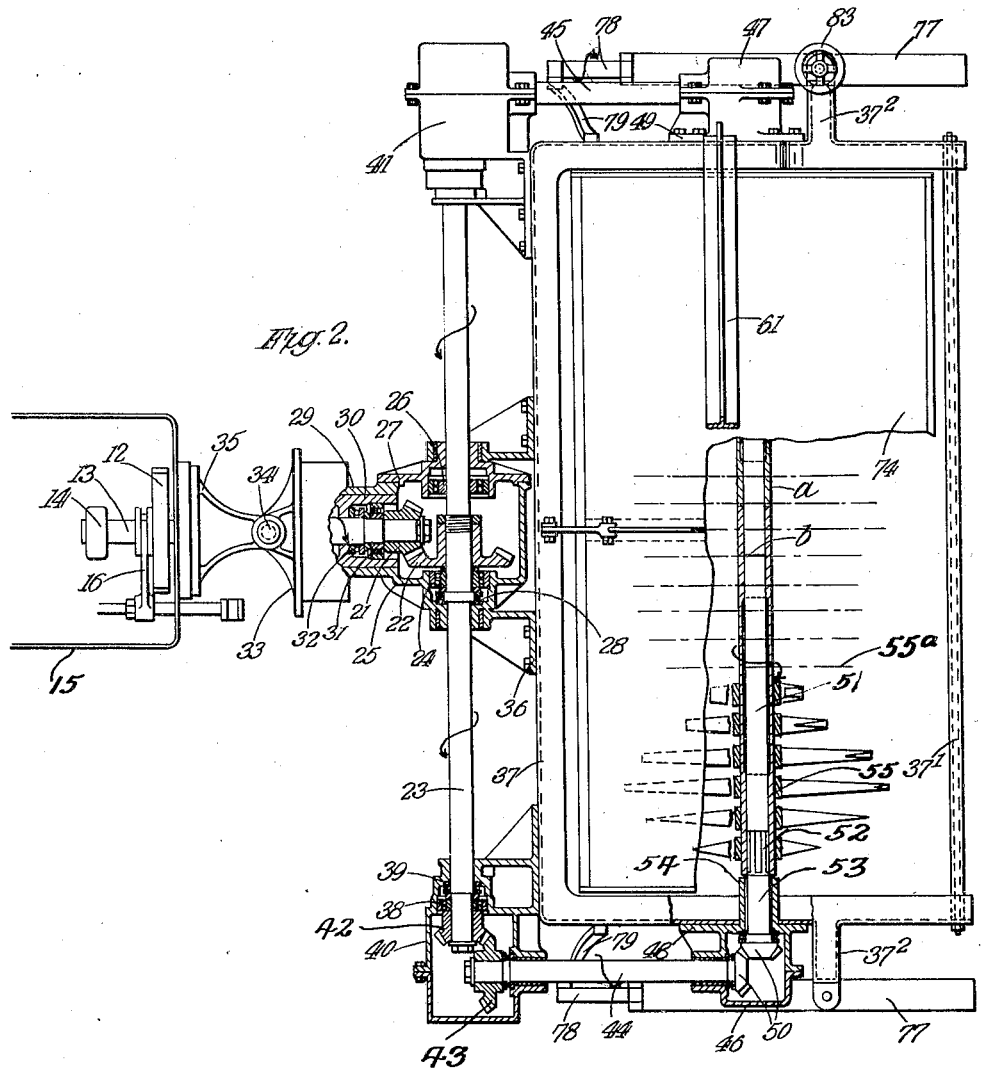

Patented Jan. 11, 1927.

1,614,356

UNITED STATES PATENT OFFICE.

EDWARD HAMMOND WHALLEY FOOT, OF SPALDING, ENGLAND.

DRIVEN IMPLEMENT.

Application filed October 6, 1924, Serial No. 742,074, and in Great Britain November 8, 1923.

This invention comprises various improvements in motor driven rotary tilling machines, the improvements relating more particularly to the miller and having for their object a machine which will be more efficient and adaptable than those previously designed.

The accompanying drawings illustrate a motor driven rotary tilling machine embodying the invention, in which:—Fig. 1 is a side elevation, Fig. 2 a plan, partly in section; and Fig. 3 a detail view showing a portion of the means for raising the shaft which carries the tines.

The engine shaft is connected, through change speed and reversing gear, (not shown, and preferably adapted to give four different speeds for forward driving) to a hollow shaft 1 on which a worm 2 engages with a worm wheel 3 on a shaft 4. A pinion 5 on the shaft 4 gears with a toothed wheel 6 on the axle 7 of the driving wheels 8 of the tractor. A clutch (not shown) is adapted to move the pinion 5 into and out of engagement with the wheel 6.

A thrust bearing 9 is shown on the shaft 1 and a shaft 10, disposed within the hollow shaft 1, carries a pinion 11 which gears with a toothed wheel 12 on a shaft 13 which is supported in a bearing 14 secured to a casing 15 in which the change speed and reversing gear for the tractor are also contained. A clutch 16, operated, preferably by a pedal, from the driver's seat, serves to move the wheel 12 into and out of engagement with the pinion 11. An additional pinion and gear wheel may be inserted in order to provide a two speed drive for the tiller shaft.

The shaft 13 is connected by a universal joint 17 to a shaft 18. The universal joint 17 comprises a vertical pin 19 and a horizontal pin 20 and consequently allows relative motion in the horizontal and vertical planes between the tilling machine and the tractor. The arrangement allows the tines of the tiller to be set in rotation before the tractor is driven forward.

The shaft 18 carries at its opposite end a bevel wheel 21 engaging with a bevel wheel 22 secured to a transversely disposed shaft 23. The shaft 23 is mounted in a removable ball bearing 24 provided in a casting 25 and in a similar bearing 26 inserted in the cover 27 of the casting. A bearing to take up lateral thrust is shown at 28.

The casting 25 has a forwardly extending sleeve 29 within which is an inner sleeve 30, and a ball bearing 31 and a thrust bearing 32 for the shaft 18 are contained within the sleeve 30. The sleeves 29 and 30 are secured within the hollow cylindrical extension of a bracket 33 removably fastened by pins 34 to a bracket 35 secured to the casing 15. The casting 25 is attached at 36 to a transverse member of a frame 37, the rear extensions of which are joined by a tie bar 37'.

The shaft 23 is supported at each end in radial and thrust bearings 38, 39 provided in hollow casings 40, 41 bolted to the frame 37. Bevel wheels 42 engage with bevel wheels 43 secured to shafts 44, 45 which extend rearwardly along the opposite sides of the frame 37. The shafts 44 and 45 are supported in the casings 40, 41 and in similar casings 46, 47 bolted at 48, 49 to the side members of the frame 37. Bevel gearing 50 in the casings 46, 47 transmits the rotation imparted to the shafts 44, 45 to a transverse shaft 51 which is divided approximately into substantially equal lengths and adapted to engage by splines 52 with corresponding grooves in the axles 53 of the gear wheels 50. The axles 53 are mounted in tubular extensions 54 of the casings 46 and 47.

A sleeve or miller 55, also divided at or near the centre of its length, is secured to the shaft 51, the division of the sleeve and shaft allowing for slight variations in the gear setting.

The divisions of the sleeve and shaft which are not in the same plane are shown at $a$ and $b$ respectively.

The tines 55$^a$ may be secured to the divided sleeve or miller 55 in any suitable manner.

A lug 56 on the casting 25 is connected by a rod 57 and spring 57$^a$ to the main frame 58 which is preferably of channel section.

The device for lifting the tiller is constructed preferably as follows: A rope or chain 59 is secured to an eye 60 attached to a plate 61 linked to the sleeve 55 and passes over a pulley 62 mounted on a lug 63 on a cross bar secured to the frame 58; the rope then passes over pulleys 64 mounted in a loop 65 slidable in a frame 66, which is supported from the frame 58 by struts 67, and then passes round pulleys 68 mounted against axial movement at the end of the frame 66. The rope passes again round the pulleys 64 and back to the pulleys 68 and to the frame 66 where it is fastened.

On the frame 66 is a cylinder 69 in which a plunger 70 is adapted to be moved to the left (Figs. 1 and 3) by oil pressure admitted through a pipe 71. The pressure may be produced by a pump of any suitable type and preferably by the same pump which releases the rear wheels of the tractor. The plunger 70 is connected to or integral with the looped member 65 of which an integral extension 72, in the form of a screw-threaded rod, passes freely through a hole in the end of the frame 66.

A nut 73, formed as a hand operated wheel is threaded on the rod 72.

As the plunger 70 is moved to the left (Fig. 1), the pulleys 64 move with it and raise the eye 60 and with it the tiller and the rear ends of the shafts 44, 45 which rotate about the axis of the shaft 23. The depth of the cut is determined on the return movement of the plunger and pulley which is effected, under the weight of the parts lifted, by the position given to the nut 73 which, by abutting against the end of the frame 66, limits the descent of the tiller and its associated gearing.

A shield 74 surrounds the tines and can be rotated about the sleeve 55 and held in the position set by an arm 75 which is secured at one end to the frame 37 and at the other end carries a pin adapted to be inserted in any of the holes 76 provided on the shield.

Flat iron skids 77 are provided at each end of the shaft 51 in order to keep it level with the ground and are linked by rods 78, 79 to the frame 37.

The skids can be raised and lowered by screw threaded rods 80 engaging with the threaded apertures in transverse extensions 37² of the frame 37. The rods 80 are secured to the skids by the engagement of their lower enlarged ends 81 in the recesses provided by stirrup-shaped members 82 fastened to the skids. The skids are raised and lowered by rotating the rods 80 by means of the handles 83.

I claim:

1. A machine of the class described comprising a tractor carrying a driven shaft, a housing pivoted to said tractor on a vertical axis for limited lateral swinging movement relative to said tractor, a transverse shaft journalled in said housing, a driving connection between said transverse shaft and said driven shaft and effective in any position of said transverse shaft, a frame pivototed on said transverse shaft for vertical swinging movement, a rotary tool shaft carried in said frame, and a driving connection between said transverse shaft and rotary tool shaft.

2. A machine according to claim 1 wherein the rotary tool shaft is divided between its ends and there is a separate driving connection between the transverse shaft and each of the parts of the rotary tool shaft.

3. A tractor carrying a driven shaft, a housing pivoted to said tractor on a vertical axis for limited lateral swinging movement relative to said tractor, a transverse shaft journalled in said housing, a shaft coaxial with said driven shaft, a universal joint connecting one end of said last-named shaft with said driven shaft and permitting movement on an axis coaxial with the vertical axis of said housing, a driving connection between the other end of said last-named shaft and said transverse shaft and effective in any position of the transverse shaft, a frame pivoted on said transverse shaft for vertical swinging movement, a rotary tool shaft carried in said frame, and a driving connection between the transverse shaft and rotary tool shaft.

4. A machine of the class described comprising a tractor carrying a driven shaft and of which the frame extends rearwardly and upwardly, a housing pivoted to said tractor on a vertical axis for limited lateral swinging movement relative to said tractor, a transverse shaft journaled in said housing, a driving connection between said transverse shaft and said driven shaft and effective in any position of the transverse shaft, a frame having its forward end pivoted on said transverse shaft for vertical swinging movement, a rotary tool shaft carried in said frame, a driving connection between said transverse shaft and rotary tool shaft, and means for supporting the rear end of said tool carrying frame from the tractor frame adjacent the rear end of the latter.

5. A machine of the class described comprising a tractor carrying a driven shaft, a housing pivoted at its forward end to said tractor on a vertical axis for limited lateral swinging movement relative to said tractor, means supporting said housing adjacent its rear end from the frame of the tractor, a transverse shaft journaled in said housing, a driving connection between said transverse shaft and said driven shaft and effective in any position of the transverse shaft, a frame having its forward end pivoted on said transverse shaft for vertical swinging movement, a rotary tool shaft carried in said frame, a driving connection between the transverse shaft and rotary tool shaft, and means for limiting downward movement of the rear end of said frame.

In testimony whereof I have signed my name to this specification.

EDWARD HAMMOND WHALLEY FOOT.